US012749270B2

(12) United States Patent
Blechschmidt et al.

(10) Patent No.: US 12,749,270 B2
(45) Date of Patent: Sep. 29, 2026

(54) SMART INTERACTIVITY FOR SCANNED OBJECTS USING AFFORDANCE REGIONS

(71) Applicant: Apple Inc., Cupertino, CA (US)

(72) Inventors: Angela Blechschmidt, San Jose, CA (US); Gefen Kohavi, San Carlos, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 213 days.

(21) Appl. No.: 18/330,652

(22) Filed: Jun. 7, 2023

(65) Prior Publication Data

US 2023/0394773 A1 Dec. 7, 2023

Related U.S. Application Data

(60) Provisional application No. 63/365,956, filed on Jun. 7, 2022.

(51) Int. Cl.
*G06T 19/00* (2011.01)
*G06T 15/10* (2011.01)

(52) U.S. Cl.
CPC ............ *G06T 19/006* (2013.01); *G06T 15/10* (2013.01); *G06T 2200/24* (2013.01)

(58) Field of Classification Search
CPC ....... G06T 19/00; G06T 19/006; G06T 15/10; G06V 10/764; G06V 20/20; G06V 20/64; G06V 40/28; G06F 3/017; G06F 3/011
See application file for complete search history.

(56) References Cited

U.S. PATENT DOCUMENTS

| | | | | |
|---|---|---|---|---|
| 10,354,139 | B1 * | 7/2019 | Li | G06V 10/764 |
| 11,014,246 | B2 * | 5/2021 | Kuwamura | B25J 11/0005 |
| 2021/0264669 | A1 * | 8/2021 | Shreve | G06T 7/70 |
| 2022/0402125 | A1 * | 12/2022 | Moreno Noguer | B25J 9/161 |

OTHER PUBLICATIONS

Priyanka et al., "Learning Dexterous Grasping with Object-Centric Visual Affordances", Submitted Sep. 3, 2020, https://arxiv.org/abs/2009.01439 (Year: 2020).*

Aldoma et al., "Supervised Learning of Hidden and Non-Hidden 0-order Affordances and Detection in Real Scenes", Jun. 28, 2012, IEEE Xplore, https://doi.org/10.1109/ICRA.2012.6224931 (Year: 2012).*

(Continued)

*Primary Examiner* — Kee M Tung
*Assistant Examiner* — Thang Gia Huynh
(74) *Attorney, Agent, or Firm* — Blank Rome LLP

(57) ABSTRACT

Generating a virtual representation of an interaction includes determining a potential user interaction with a physical object in a physical environment, determining an object type associated with the physical object, and obtaining an object-centric affordance region for the object type, wherein the object-centric affordance region indicates, for each of one or more regions of the object type, a likelihood of user contact. The object-centric affordance region is mapped to a geometry of the physical object to obtain an instance-specific affordance region, is used to render the virtual representation of the interaction with the physical object.

18 Claims, 7 Drawing Sheets

(56) References Cited

OTHER PUBLICATIONS

Deng et al., "3D AffordanceNet: A Benchmark for Visual Object Affordance Understanding", Mar. 31, 2021, arXiv, https://doi.org/10.48550/arXiv.2103.16397 (Year: 2021).*
Sansar Help, "Defining Grab Points," Jul. 28, 2020, Retrieved from the Internet: URL: https://help.sansar.com/hc/en-us/articles/360001396786-Defining-grab-points [Retrieved on Dec. 15, 2021].
Unity Manual Version 2020.3, "Inverse Kinematics," Dec. 10, 2021, Retrieved from the Internet: URL: https://docs.unity3d.com/Manual/InverseKinematics.html [Retrieved on Dec. 15, 2021].

* cited by examiner

SMART INTERACTIVITY FOR SCANNED OBJECTS USING AFFORDANCE REGIONS

BACKGROUND

Today's electronic devices provide users with many ways to interact with the world around them and with others. As an example, a user can interact with others located in a different environment through an immersive experience, such as extended reality (XR), via an electronic device. An XR environment may include a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. Some XR environments allow multiple users to interact with each other within the XR environment.

However, difficulties arise when a user interacts or makes contact with a physical object in a local environment which is not represented in XR environment. For example, a remote user interacting with the local user in the XR environment may see a representation of the user that lacks context because the object with which the user is interacting is not represented in the XR environment.

DETAILED DESCRIPTION

Figure 1:
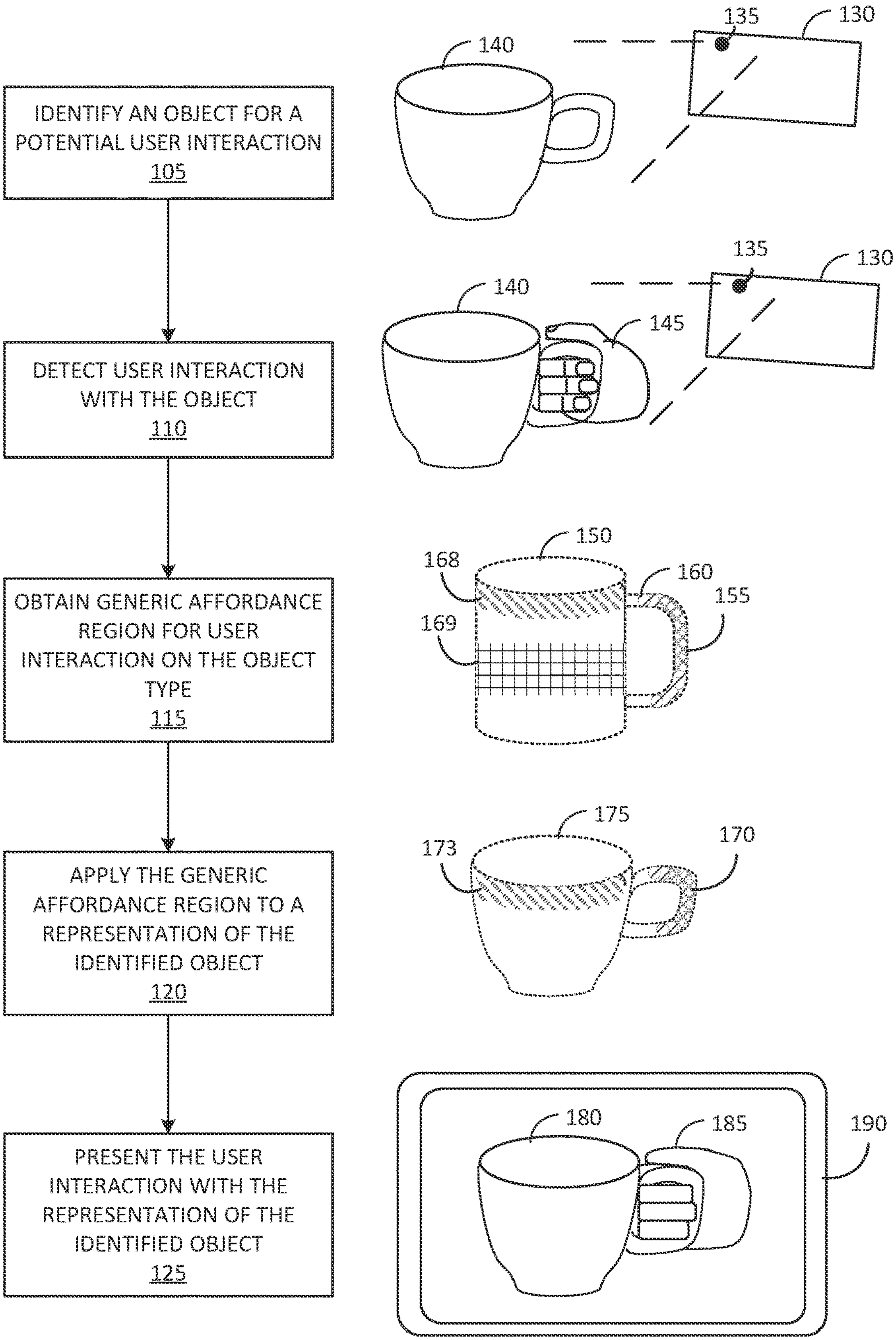
FIG. 1 shows a flow diagram for providing a representation of a physical object using an affordance region, according to some embodiments.

This disclosure relates generally to techniques for enhanced presentation of user interactions. More particularly, but not by way of limitation, this disclosure relates to techniques and systems for informing interactions between virtual characters and virtual objects based on real-world objects.

This disclosure pertains to systems, methods, and computer readable media to enhance an avatar presentation of a user when the user is interacting with a physical object in the physical environment of the user. Generally, embodiments may include scanning a real-world object and creating virtual objects that are interactable by virtual characters. In some embodiments, a 3D canonical object representation is created per object type, and affordance regions are created using object-user interaction annotations. Some embodiments include scanning and obtaining an instance specific 3D representation of a target real-world object. A mapping function is applied from the instance-specific object to the canonical representation. In general, if physical contact or interaction is detected between a user and a physical object, then an object type is determined for the physical object. From the object type, an object-centric affordance region may be obtained, for example, based on the object-user interaction annotations. The object-centric affordance region may include a representation of a shape of a generic version of the object type, where the representation indicates a likelihood that various portions of the surface of the object may be a point of contact with the user. That is, a generic representation of the handbag may be associated with an object-centric affordance region indicating the likelihood that particular portions of the bag are the point of contact with a user during a user interaction. For example, if the object is a handbag, the handles of the handbag may be associated with a higher likelihood of user contact than the walls of the handbag.

In one or more embodiments, a geometric representation of the specific object may be obtained. For example, a scan may be performed in the physical environment to determine a three-dimensional geometric representation of the physical object, such as a 3D geometric representation, for example a mesh representation. Then, the object-centric affordance regions associated with the generic object type can be applied to the geometric representation of the specific object to obtain instance-specific affordance regions. The instance-specific affordance regions may represent areas where a specific action may occur and, as such, may be action-specific. The instance-specific affordance regions may then be used to render a representation of the user interacting with a representation of the virtual object. For example, in the situation of the user holding the handbag, an avatar representation of the user may be rendered such that the avatar of the user is holding a representation of the handbag by the handles, as opposed to holding the representation in an unnatural or unexpected manner, such as by the side of the body. Accordingly, in some embodiments described herein, the interaction between a virtual object and a virtual character is determined and provided to assist in rendering the virtual object and the virtual character.

The affordance region for an object type can be generated by performing a correspondence mapping across objects of a particular object type for a particular user interaction. In some embodiments, the correspondence mapping may be performed based on a set of training data for a particular object type and user interaction type. For each user interaction, a geometric representation of the object and a geometric representation of the user may be obtained. Then a contact value for each portion of the geometric representation, such as a face of the mesh, may be assigned. The correspondence mapping may include determining a contact likelihood on a generic shape for the object type.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100*a* and 100*b*). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints) and that these goals will vary from one implementation to another. It will also be appreciated that such development efforts might be complex and time consuming but would nevertheless be a routine undertaking for those of ordinary skill in the art of image capture having the benefit of this disclosure.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an XR environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

Turning to FIG. 1, a flow diagram is shown for providing a representation of a physical object using an affordance region, according to some embodiments. For purposes of explanation, the following steps will be described in the context of particular components. However, it should be understood that the various actions may be performed by alternate components. In addition, the various actions may be performed in a different order. Further, some actions may be performed simultaneously, and some may not be required, or others may be added.

The flow diagram begins at block 105 where an object in a physical environment is identified for a potential user interaction. In the example shown, the system 130 may include one or more sensors 135 which may detect the cup 140 as a physical object in the environment. According to some embodiments, the cup 140 may be detected as an object in the physical environment and/or may be detected as a physical object in the environment likely to be the subject of user interaction.

The flow diagram continues at block 110 where the system detects a user interaction with the object. As shown, the system 130 detects the interaction between the user's hand 145 and the cup 140. In some embodiments, the contact may be determined, for example, based on depth information gathered from the sensor 135. In some embodiments, hand tracking or other technology may be used to track a user's movement in relation to the environment. The user interaction may be detected in response to confirming that a contact event has occurred between the user and a physical object in the environment or may be detected when a touch is imminent, such as when a touch event is predicted based on user cues and the like.

At block 115, the system obtains an object-centric affordance region for user interaction on the object type. According to one or more embodiments, an affordance region may be specific to the object type of a particular classification. The object-centric affordance region may indicate a likelihood of contact occurring at various regions on a generic representation of the object type. For example, a three-dimensional representation of a cup 150 may include an object-centric affordance region 155 which indicates portions of the geometry of the generic object associated with a particular likelihood to be affected by the user contact. As such, a first object-centric affordance region 155 may indicate a portion of a handle of the cup 150 most likely to make contact with a user during a user interaction. Similarly, a second object-centric affordance region 160 may indicate a portion of a handle of the cup 150 associated with a different likelihood of being or including a point of contact with a user during a user interaction. In some embodiments, the collection of the affordance regions for a particular action may be an object-centric affordance map. Further, in some embodiments, the object may be associated with multiple object-centric affordance regions, specific to different contact actions between a user and the object type. For example, as shown by region 168, at the rim of the glass likely to make contact with a user's mouth while the user is taking a drink. For example, if the detected user interaction at block 110 is associated with a user holding the cup to drink, then the affordance region may indicate that portions of the cup around the handle are most likely associated with user contact (for example, object-centric affordance regions 165 and 168). Similarly, if the user interaction detected at block 110 is based on removing a cup from a dishwasher or otherwise storing a clean cup, then the affordance region may differ (for example, object-centric affordance regions 165 and 169). As such, the object-centric affordance region obtained at block 115 may be specific to the object type (e.g., the generic representation 150 of the specific cup 140), and in some embodiments, the object-centric affordance region obtained at block 115 may be specific to the combination of the object type and the interaction type.

In some embodiments, the three-dimensional representation of the cup 150 may be a three-dimensional representation, where at least some regions of the three-dimensional representation are associated with a value representative of a likelihood of user contact. Notably, the three-dimensional representation of the cup 150 is associated with a generic cup and is not specific to the actual identified cup 140.

At block 120, the object-centric affordance region is applied to a representation of the identified object to obtain an instance-specific affordance region. As shown in the example, a three-dimensional representation of the specific cup 175 is obtained. That is, the three-dimensional representation of the specific cup 175 is specific to the cup 140 identified at block 105. For example, the system may obtain a geometric representation of the specific cup. The three-dimensional representation of the specific cup may be obtained, for example, at block 105 when the object is identified. The system 130 may perform a scan using the one or more sensors 135 which may provide depth information for the specific cup 140 and, from there, a three-dimensional representation, such as a mesh representation, may be determined for the cup. Alternatively, in some embodiments, the system 130 may obtain a specific three-dimensional representation of the specific cup through a lookup. For example, if the particular object is preregistered, or otherwise associated with a predetermined three-dimensional representation, the three-dimensional representation may be retrieved upon identification of the object, such as through object detection techniques. In some embodiments, applying the object-centric affordance region (e.g., object-centric affordance region 155) to the specific representation 175 of the identified object includes morphing the generic geometric representation with the object-centric affordance region from block 115 onto the specific geometric representation. Alternatively, other techniques, such as deep learning, may be used to determine correspondences between the generic three-dimensional representation (e.g., representation 150) and the specific three-dimensional representation (e.g., representation 175). As a result, an instance-specific affordance region may be determined for the specific object, as shown with respect to instance-specific affordance region 170 and instance-specific affordance region 173 for the specific representation 175.

The flow diagram concludes at block 125 where a user is presented with an interaction of the representation of the defined object 125. In some embodiments, the instance-specific affordance region for the specific object may be provided to an image processing pipeline for use in generating a virtual representation (i.e., avatar) of the user performing the interaction with the physical object. Accordingly, a system can generate a virtual representation of the cup 180 as it is held by a virtual representation of the user 185 for display on a display device 190. Notably, the display device 190 may be part of the same system 130 or a different system. That is, the affordance region and/or the resulting image data may be provided to a remote device for generation and/or presentation of an avatar representation of the user's hand 145 holding the cup 140. As such, when the avatar of the user is rendered, the interaction with the cup appears realistic, and the representation of the cup is based on the real-world cup being held by the user. As such, the rendered interaction may provide additional contextual information to a second user viewing the avatar interaction on a user interface or display device.

Figure 2:
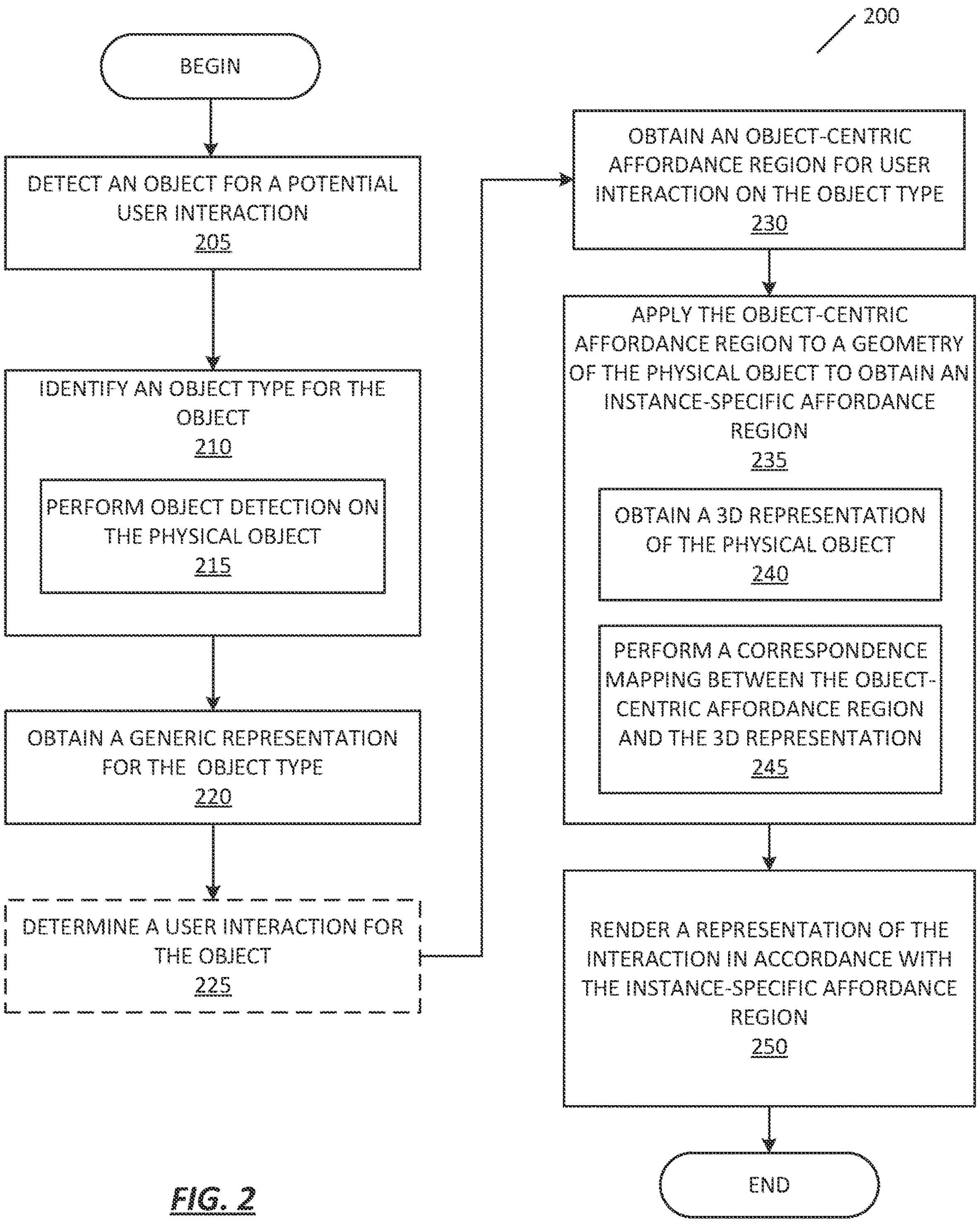
FIG. 2 shows a flowchart of a technique for rendering representation of a physical object using an affordance region, according to one or more embodiments.

FIG. 2 shows a flowchart of a technique for rendering representation of a physical object using an affordance region, according to one or more embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart 200 begins at block 205 where a system detects an object for a potential user interaction. Objects in the environment may be detected, for example, through object detection techniques, three-dimensional scanning of the environment, or the like. Further, objects in the environment may be preregistered such that characteristics of the object are known to the system, or the objects may be unknown. In some embodiments, user movement may be monitored, for example, through visual data, motion detection, and the like. The system may detect the object based on the appearance of the object in the environment. Additionally, or alternatively, the system may detect the object is a potential subject of user interaction based on user cues. For example, user tracking techniques, such as hand tracking, gyroscopic data, location data, or the like, may be used to predict an impending interaction between the user and a physical object in the environment. According to one or more embodiments, a set of heuristics or a trained network may be used to predict a current or impending potential user interaction between a user and a physical object.

The flowchart continues at block 210 wherein the system identifies an object type for the object. According to one or more embodiments, an object type of the specific object detected at block 205 may be determined. According to some embodiments, the object type is a classification of objects, for example detected by object recognition. Accordingly, the object type may be identified from a predetermined set of object types corresponding to object classifications. In some embodiments, the object type may be a classification pre-assigned to a specific object, for example through a registration process. As such, the object type may be determined, for example, from a lookup table or other structure if a specific pre-registered object is identified or may be determined based on other machine vision techniques. Thus, in some embodiments, identifying an object type for the object at 210 includes, at block 215, performing object detection of the physical object.

The flowchart 200 continues block 220, the flowchart includes obtaining a generic geometric representation for the physical object. According to some embodiments, the geometric representation may be a predetermined geometric representation corresponding to the object type of the physical object. For example, the object type may include a classification of the object for which a geometric representation is predetermined. The generic geometric representation may be obtained, for example, from local storage or from remote sources, such as a storage of a remote device in the local environment, from a server communicably coupled to the local system, or the like. The geometric representation may be an indication of a geometry of a generic version of the object type. As an example, referring to FIG. 1 above, a specific cup 140 detected in a scene may have a unique shape (here, like a teacup). However, the generic geometric representation may be associated with the classification of the object, not the specific object itself. As such, if the cup 140 is classified as a "coffee cup" as an object type, a generic geometric shape for a "coffee cup" may look like a cylindrical mug, as shown by geometric shape 150. The geometric representation may be any representation of a geometry of an object. In some embodiments, the geometric representation may be a three-dimensional representation of an object.

The flowchart 200 continues at block 225 where the system determines a user interaction for the object. The user interaction determined may include, for example, an interaction type or other information related to the interaction. That is, the particular object may be interacted with in multiple ways, each associated with a different distribution of likely points of contact. For example, a user may make contact using different parts of the user's body, such as touching a chair and sitting in a chair. As another example, the object may be used by the user in different way based on user behavior, such as a rolling luggage, which may have a first handle for use when a user is carrying the luggage and a second handle when a user is dragging the luggage. As such, in some embodiments, a particular type of interaction may be determined, such as through identification and/or prediction, as will be described in greater detail below with respect to FIG. 3.

At block 230, an object-centric affordance region is obtained for the user interaction on the object type. In some embodiments, the object-centric affordance region may be associated with a distribution of likely contact points on a generic representation of the physical object. For example, the object-centric affordance region may include a value corresponding to a likelihood of user interaction for at least some portions of a three-dimensional representation of the generic object. As an example, the object-centric affordance region may include a probability value assigned to each of one or more faces of a three-dimensional representation of the generic object. The object-centric affordance region may include different granularity, both in terms of the regions associated with a likelihood of touch and how the probability of touch is detected. For example, a value may be assigned to a region of the geometry which may include more than one face of the object. Further, the probability value may include a value based on a pretrained network, previously determined data, or the like. The development of the object-centric affordance region will be described in greater detail below with respect to FIGS. 4-5.

The flowchart continues at block 235 where the object-centric affordance region is applied to the geometry of the specific physical object to obtain an instance-specific affordance region. The object-centric affordance region may be applied to the geometry of the specific physical object by determining correspondences between the generic representation of the type or class of object and the specific representation of the specific object and then remapping the affordance values onto the specific representation accordingly, in some embodiments. At block 240, the flowchart 200 includes obtaining a geometry of the physical object, such as a mesh representation of the physical object. In some embodiments, the system may store or have access to geometric information and/or other information for a generic version of the object. Additionally, or alternatively, the system may obtain a geometry for the physical object by performing a scan of the physical object in the physical environment. For example, sensor data may be collected for the physical object from which geometric features for the object may be determined. As an example, the system may perform a scan to determine geometric features of the object. In some embodiments, the geometric information may be obtained from additional systems. For example, sensor data may be collected from additional systems, such as other devices in the environment from which sensor data may be collected from different viewpoints. As another example, a particular object may be identified and the geometry for the particular object may be obtained from storage, for example on the local system and/or remote system such as another system in the environment or a server device communicably coupled to the local system. In some embodiments, the geometry may be represented in the form of a description and/or a three-dimensional representation such as a point cloud, three-dimensional mesh, or the like.

The flowchart continues at block 245 where a correspondence mapping is performed between the object-centric affordance region obtained at block 230 and the geometric representation specific to the physical object obtained at block 240. The correspondence mapping may be performed in a variety of ways. For example, in some embodiments, the three-dimensional generic representation may be morphed into the three-dimensional specific representation to determine correspondences among portions of the geometry. From there, values may be assigned to corresponding portions of the geometry. As another example, a deep learning-based approach may be performed such that given the two three-dimensional representations, correspondences can be identified. As a result of applying the object-centric affordance region to the geometry of the physical object, an instance-specific affordance region may be determined.

The flowchart 200 concludes at block 250 where a representation of the user interacting with the representation of the detected object is rendered in accordance with the instance-specific affordance region. As such, an avatar representation of the user may be presented interacting with a virtual version of the specific object the user is interacting with in the physical environment. According to some embodiments, the instance-specific affordance region may be passed to an image processing pipeline and considered in rendering an avatar representation of the user to cause the avatar representation to be presented interacting with a virtual version of the specific object in a realistic manner.

Figure 3:
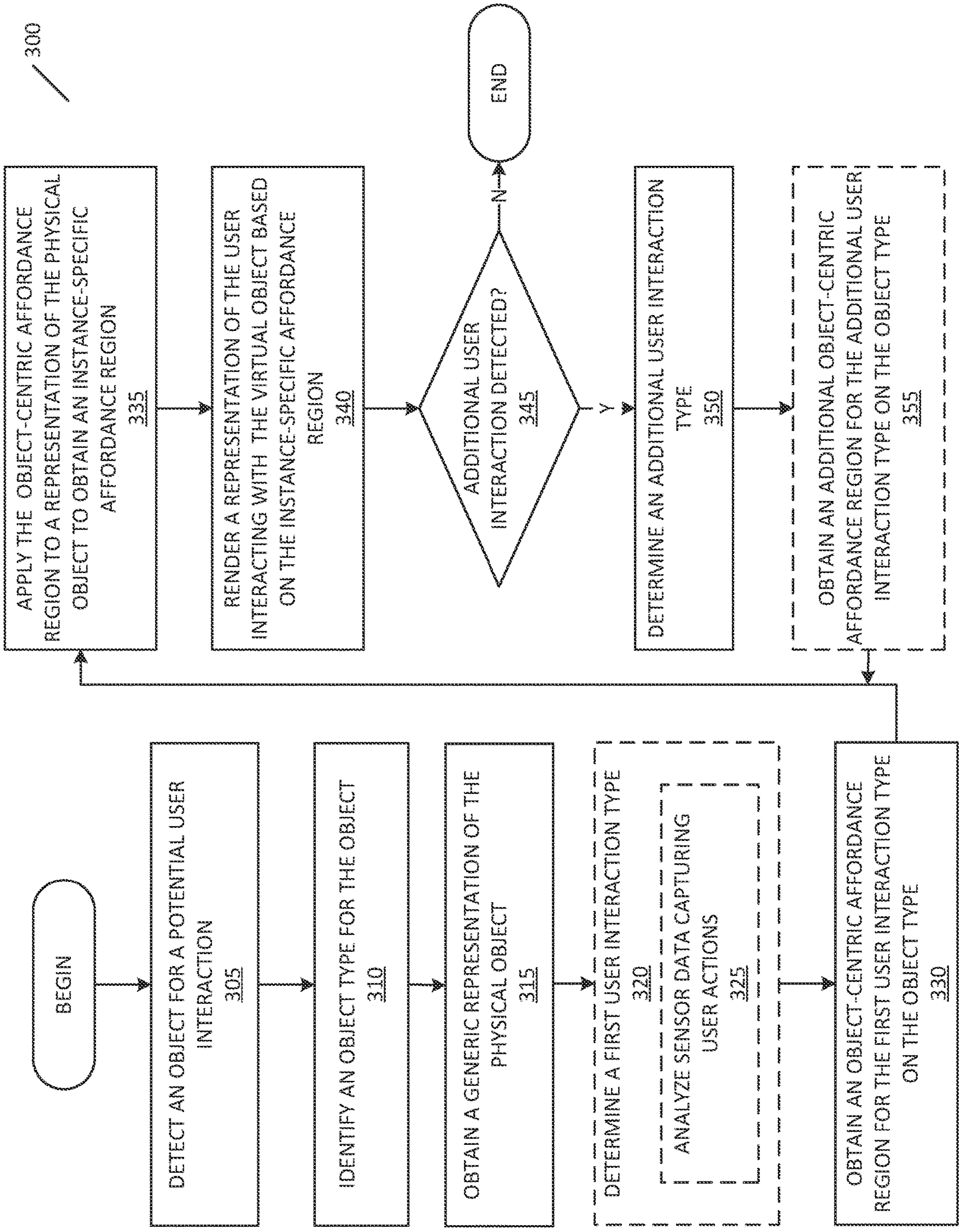
FIG. 3 shows a flowchart of a technique for modifying an affordance region for user interaction, in accordance with some embodiments.

According to one or more embodiments, an affordance region may be determined based on a single user interaction, or multiple user interactions. FIG. 3 shows a flowchart depicting a technique for obtaining affordance regions for multiple user interactions with a particular object. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart 300 begins at block 305 where a system detects an object for a potential user interaction. Objects in the environment may be detected, for example, through object detection techniques, three-dimensional scanning of the environment, or the like. Further, objects in the environment may be preregistered such that characteristics of the object are known to the system, or the objects may be unknown. In some embodiments, user movement may be monitored, for example, through visual data, motion detection, and the like. The system may detect the object based on the appearance of the object in the environment. Additionally, or alternatively, the system may detect the object is a potential subject of user interaction based on user cues. For example, user tracking techniques, such as hand tracking, gyroscopic data, location data, or the like, may be used to predict an impending interaction between the user and a physical object in the environment. According to one or more embodiments, a set of heuristics or a trained network may be used to predict a current or impending potential user interaction between a user and a physical object.

The flowchart continues at block 310 wherein the system identifies an object type for the object. According to one or more embodiments, an object type of the specific object detected at block 305 may be determined. According to some embodiments, the object type is a classification of objects, for example detected by object recognition. Accordingly, the object type may be identified from a predetermined set of object types corresponding to object classifications. In some embodiments, the object type may be a classification pre-assigned to a specific object, for example through a registration process. As such, the object type may be determined, for example, from a lookup table or other structure if a specific pre-registered object is identified, or may be determined based on other machine vision techniques.

The flowchart 300 continues block 315, the flowchart includes obtaining a generic geometric representation for the physical object. According to some embodiments, the geometric representation may be a predetermined geometric representation corresponding to the object type of the physical object. For example, the object type may include a classification of the object for which a geometric representation is predetermined. The generic geometric representation may be obtained, for example, from local storage or from remote sources, such as a storage of a remote device in the local environment, from a server communicably coupled to the local system, or the like. The geometric representation may be an indication of a geometry of a generic version of the object type. As an example, referring to FIG. 1 above, a specific cup 140 detected in a scene may have a unique shape (here, like a teacup). However, the generic geometric representation may be associated with the classification of the object, not the specific object itself. As such, if the cup 140 is classified as a "coffee cup" as an object type, a generic geometric shape for a "coffee cup" may look like a cylindrical mug, as shown by geometric shape 150. The geometric representation may be any representation of a geometry of an object. In some embodiments, the geometric representation may be a three-dimensional representation of an object.

At block 320, the flowchart 300 includes determining a first user interaction type. As described above, an affordance region associated with a distribution of likely regions of the object at which contact will occur during user interaction may be specific to a particular type of user interaction. Accordingly, at block 320, a particular type of user interaction may be determined. The user interaction type may be associated with a particular gesture, use of the object, part of the user for which contact is made with the object during the user interaction, or the like. As shown at block 325, in one or more embodiments, determining the particular user interaction may include analyzing sensor data capturing user actions. The sensor data may include, for example, hand tracking, gaze tracking, motion data, image data, and the like. According to one or more embodiments, deep-learning techniques may be deployed to predict a particular user interaction. For example, the various sensor data or other data related to the user action may be applied to a trained network to predict a user interaction type for the physical object.

The flowchart 300 continues at block 330 where an object-centric affordance region is obtained for the first user interaction type performed on the object type. That is, an object type may be associated with multiple affordance regions for different interaction types. Returning to the example of the rolling luggage, if the user interaction includes carrying the luggage, then a first object-centric affordance region may be identified for the interaction, indicating a stronger likelihood of contact being made around a carrying handle for the luggage. By contrast, if the user interaction includes dragging the luggage, then an affordance region for the action may indicate a stronger likelihood of user interaction along a dragging handle surface of the luggage. As such, the object-centric affordance region obtained at 330 may be specific to a combination of the generic object type and the interaction type.

At block 335 the object-centric affordance region may be applied to a geometry of the specific physical object. As described above, applying the object-centric affordance region to a geometry of the physical object may include obtaining a three-dimensional representation for the generic object type corresponding to the physical object, where the object-centric affordance region is associated with the three-dimensional representation for the generic object type. Then a three-dimensional representation of the specific physical object may be obtained. Applying the object-centric affordance region to the geometry of the physical object may include determining correspondences between the three-dimensional representation for the generic object type and the three-dimensional representation of the specific physical object. Based on the correspondences, the values from the object-centric affordance region can be remapped to the three-dimensional representation of the specific physical object, resulting in an instance-specific affordance region for the physical object and interaction type.

The flowchart continues to block 340 where a representation of the user interacting with a representation of the physical object is rendered based on the instance-specific affordance region. As such, an avatar representation of the user may be presented interacting with a virtual version of the specific object. According to some embodiments, the instance-specific affordance region may be passed to an image processing pipeline and considered in rendering an avatar representation of the user to cause the avatar representation to be presented interacting with a virtual version of the specific object in a realistic manner. In addition, the instance-specific affordance region may be used at a local device or a remote device for rendering the avatar representation of the user.

At block 345, a determination is made as to whether any potential user interactions are detected. An additional potential user interaction may include a second contact type between the user and the physical object. For example, if the object is a cup, then a first interaction type may include a user holding the cup, and a second interaction type may include the user holding the cup to their lips to drink. As another example, a user may place a hand on a chair when approaching the chair as a first interaction, and then may sit on the chair as a second interaction. Thus, at block 345 if a determination is made that an additional user interaction is detected, then the flowchart 300 continues to block 350 and an interaction type for the additional user interaction is determined. As described above, the user interaction type may be associated with a particular gesture, use of the object, part of the user for which contact is made with the object during the user interaction, or the like.

The flowchart continues to block 355, where an additional object-centric affordance region is obtained for the additional user interaction type on the object type, and the flowchart proceeds to block 335 where the system applies the additional centric affordance region to the geometry of the specific object. In one or more embodiments, the additional centric affordance region may be combined with the initial centric affordance region to generate a consolidated centric affordance region, from which an updated instance-specific affordance region can be determined. As such, if the user interactions are likely to occur concurrently, then the previously generated affordance region can be modified based on the additional object-centric affordance region to obtain an updated affordance region which may be used to render the representation of the user interaction at block 340. The flowchart continues until no additional user interactions are detected at block 345, at which point the flowchart 300 concludes.

Figure 4:
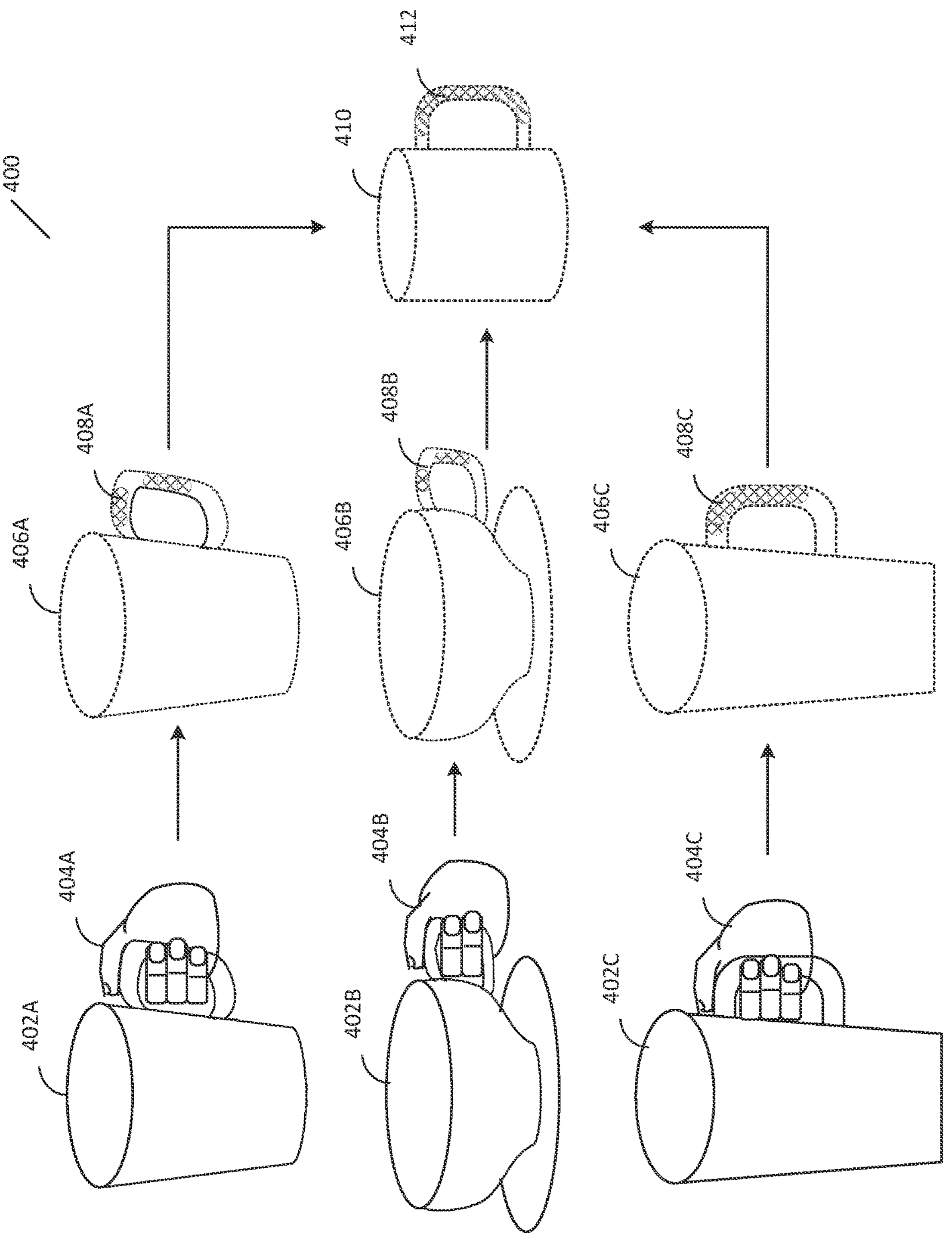
FIG. 4 shows a flowchart of a technique for generating an object-centric affordance region for a user interaction, according to some embodiments.

According to some embodiments, the generic representation for an object type and the associated affordance region may be determined from a training procedure. FIG. 4 shows a flow diagram 400 for generating a three-dimensional representation for an object type and an affordance region for the interaction. For purposes of the example, FIG. 4 shows a flow diagram 400 for a mug with a handle and is associated with a user contact event that includes a user holding the mug by the handle. However, it should be understood that the particular example depicted in FIG. 4 is provided for illustration purposes and is not intended to limit the scope of the disclosure.

According to some embodiments, in order to generate a generic three-dimensional representation, such as a mesh representation, a set of training data may be obtained of various images of users holding different types of mugs. As such, data for a user's hand 404A interacting with mug 402A may be captured. The data may include, for example, image data, depth data, location data, and the like. Further, the data may be captured from a single device or point of view or multiple devices or points of view. Similarly, data for a user's hand 404B interacting with mug 402B may be captured, and data for a user's hand 404C interacting with mug 402C may be captured. The user hands 404A, 404B, and 404C may belong to the same person or to different people. Notably, mugs 402A, 402B, and 402C correspond to objects having similar identifying features (e.g., they are all mugs with handles) but different shapes.

Each set of captured data may be analyzed to determine a three-dimensional representation of the particular object and a distribution of contact points on the three-dimensional representation based on the user interaction. In some embodiments, the three-dimensional representation may include, for example, a mesh representation or other type of three-dimensional geometric representation of the specific object. As such, representation 406A corresponds to the specific geometry of mug 402A. Similarly, representation 40613 corresponds to the specific geometry of mug 402B and representation 406C corresponds to the specific geometry of mug 402C. In some embodiments, the three-dimensional representation may be determined based on image data, depth data, and the like. A training system can synthesize the various captured data to determine a particular three-dimensional geometric representation of the object.

In addition, a set of contact points may be determined for each geometric representation based on the training data. Generally, known geometric data regarding the user and known geometric data regarding the physical object can be compared to identify regions of the physical object making contact with the user. In some embodiments, the set of contact points may include, for example, a set of regions at which contact is detected between a user and the object in the training data. In some embodiments, a contact value may be assigned to different regions of the three-dimensional representation of the object. For example, faces of a three-dimensional mesh representation may be assigned a contact value or otherwise allocated a contact designation, such as a binary indication of whether the particular region is in contact with the user or not. As shown, representation 406A is associated with contact points 408A. Similarly, representation 40613 is associated with contact points 40813 and representation 406C is associated with contact points 408C. Notably, the points of contact differ across different shapes of the mug. For example, mug 402A is associated with two distinct regions of contact depicted at 408A, whereas mug 402C is associated with a simple continuous point of contact toward the top of the handle as depicted at 408C. The different distribution of contact points may be the result of different characteristics of the different specific objects of the object type, such as shape, size, weight distribution, and the like, which may cause a user to make contact with the physical object in different ways.

From the set of three-dimensional representations and contact information, a generic representation of the object type may be obtained, as shown by representation 410. The particular generic representation for the object type may be determined, for example, based on the most common geometric shape of the physical objects of the object type. Alternatively, an average or a weighted average of object shapes may be considered in generating the generic representation of the object type 410. Further, in some embodiments, the particular generic representation for the object type may be provided by user selection. In addition, an object-centric affordance region 412 may be associated with the generic representation 410. In some embodiments, the object-centric affordance region 412 may be specific to a particular interaction type, such as the user holding the mug in the example flow diagram 400. The object-centric affordance region may be determined by considering the different sets of point of contact 408A, 40813, and 408C from the training data. In some embodiments, a correspondence mapping may be applied between each three-dimensional representation 406A, 40613, and 406C and the generic representation 410 to determine where on the generic representation 410 the contact points would lie. In some embodiments, the result is an object-centric affordance region indicating a likelihood that a particular portion of the generic representation 410 is a point of contact during user interaction. In the instance that the training data is specific to a particular interaction type, the object-centric affordance region 412 may indicate a likelihood that a particular portion of the generic representation 410 is a point of contact during the specific user interaction.

Figure 5:
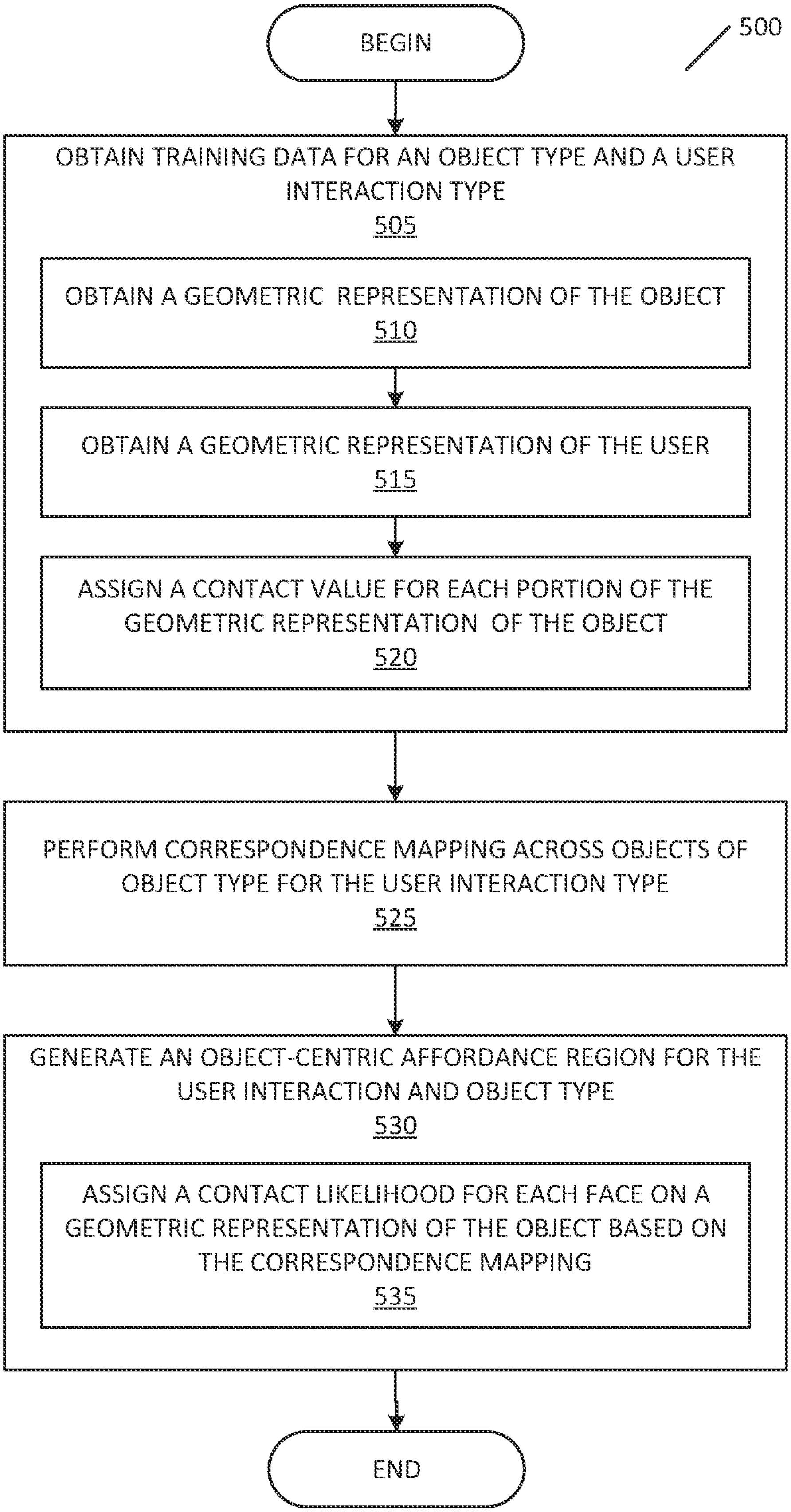
FIG. 5 shows a flowchart of a technique for generating an affordance region for a user interaction, according to some embodiments.

Turning to FIG. 5, a flowchart 500 is shown of a technique for using gesture recognition for triggering action when a user's hands are occupied, according to one or more embodiments. For purposes of explanation, the following steps will be described in the context of FIG. 1. However, it should be understood that the various actions may be performed by alternate components. In addition, the various actions may be performed in a different order. Further, some actions may be performed simultaneously, and some may not be required, or others may be added.

The flowchart 500 begins at block 505 where training data is obtained for a particular object type. In some embodiments, the training data may also be specific to a particular user interaction type. The training data may include sensor data capturing characteristics of a user interaction with a physical object. For example, the collected data can include image data, depth data, location data, and the like.

As described above, the training data may include a set of three-dimensional representations of specific physical objects in the training data along with a set of contact points or other data related to user contact for the representation of the physical object. Generally, a correlation between a geometry of the physical object and the contact points is determined. At block 510, a geometric representation of the physical object is obtained, such as a mesh representation. The geometric representation may be obtained by performing a scan or synthesizing the sensor data for the object. For example, in some embodiments, the sensor data may be applied to a trained network which predicts a three-dimensional shape of the object. As another example, feature points for the object may be collected from which a three-dimensional shape of the object may be determined. Further, in some embodiments, a three-dimensional representation may be predetermined such that the three-dimensional representation for the particular physical object may be obtained by a lookup function upon identifying the particular physical object.

At block 515, a three-dimensional representation of the user corresponding to the user interaction may be obtained. The three-dimensional representation may include, for example, a mesh representation of the user performing the user contact in the training data. In some embodiments, a generic three-dimensional representation of the user may be generated through a registration process. The shape of the representation when the user performs the particular user interaction in the training data may be determined, for example, based on performing a scan of the environment, collecting sensor data, and the like.

The flowchart 500 continues at block 520, where a contact value is assigned for each portion of the geometric representation of the object. The determination as to whether a particular region is a point of contact may be determined in a number of ways. In some embodiments, known geometric data regarding the user and known geometric data regarding the physical object can be compared to identify regions of the physical object making contact with the user. For example, in some embodiments, a representation of the user may be obtained and compared against the representation of the object to identify the portions of the representation which make contact with each other.

At block 525, the flowchart 500 includes performing a correspondence mapping across objects of the particular object type. In some embodiments, the correspondence mapping may be specific to a particular user interaction type. In some embodiments, the correspondence mapping may include performing a morphing function across the three-dimensional representations of the object type to determine correspondences of different regions of the shape of the different objects. In some embodiments, the correspondence mapping may include determining a correspondence between each of the specific three-dimensional representations of the objects and a generic three-dimensional representation for the object type. For example, a user may preselect a three-dimensional representation to use for the object type, or a generic three-dimensional representation may be predefined for the object type. The result of the correspondence mapping may include a mapping between different regions of the specific representation of the various physical objects and the generic representation for the object type.

The flowchart concludes at block 530 where the system generates an object-centric affordance region for the object type and, in some embodiments, the user interaction. In some embodiments, the object-centric affordance region may include a distribution of likelihoods of contact across the generic representation for the object type. In some embodiments, the result is an object-centric affordance region indicating a likelihood that a particular portion of the generic representation 410 is a point of contact during user interaction. In the instance that the training data is specific to a particular interaction type, the object-centric affordance region 412 may indicate a likelihood that a particular portion of the generic representation 410 is a point of contact during the specific user interaction.

In some embodiments, as shown at block 535, a contact score corresponding to a likelihood may be assigned for each face on the generic geometric representation based on the correspondence mapping. For example, a particular face of a generic mesh representation for an object type may be associated with a likelihood that the region of the mesh makes contact with the user. The contact score may include, for example, averaging or otherwise considering the contact values associated with the portion of the objects of the object type from the training data. As a result, the affordance region may be tied to the general three-dimensional representation for the object type.

Figure 6:
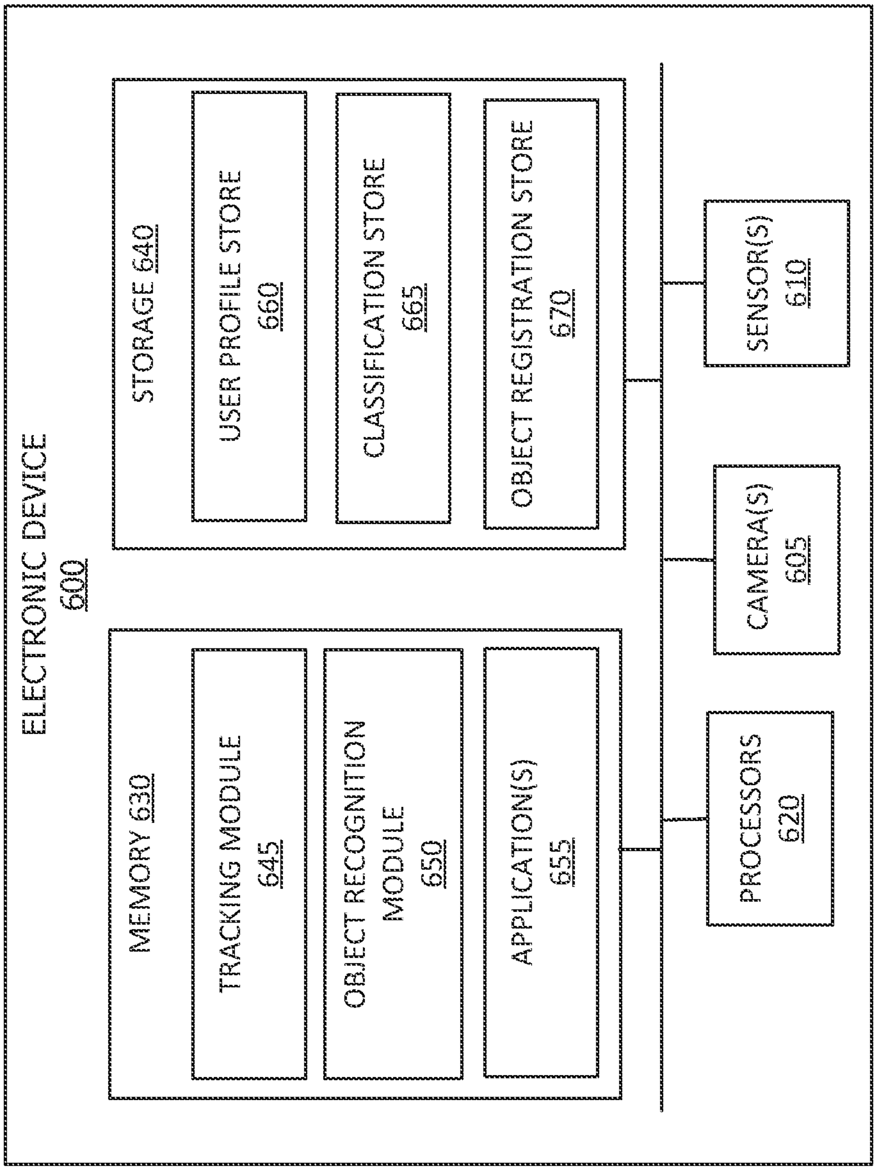
FIG. 6 shows, in block diagram form, a simplified system diagram according to one or more embodiments.

Referring to FIG. 6, a simplified block diagram of an electronic device 600 which may be utilized to provide virtual representation of users and other objects in an environment. The system diagram includes electronic device 600 which may include various components. Electronic device 600 may be part of a multifunctional device, such as a phone, tablet computer, personal digital assistant, portable music/video player, wearable device, base station, laptop computer, desktop computer, network device, or any other electronic device that has the ability to capture image data.

Electronic device 600 may include one or more processors 620, such as a central processing unit (CPU). Processor(s) 620 may include a system-on-chip such as those found in mobile devices and include one or more dedicated graphics processing units (GPUs). Further, processor(s) 620 may include multiple processors of the same or different type. Electronic device 600 may also include a memory 630. Memory 630 may include one or more different types of memory, which may be used for performing device functions in conjunction with processor(s) 620. Memory 630 may store various programming modules for execution by processor(s) 620, including tracking module 645, object recognition module 650, and other various applications 655.

Electronic device 600 may also include storage 640. Storage 640 may include user profile store 660, which may include data regarding user-specific gestures, user-specific preferences, and the like. Storage 640 may also include a classification store 665. Classification store 665 may include data that may be utilized to classify physical objects detected in an environment. Classification store 665 may also include data to classify a potential user interaction, such as a current interaction with a physical object or a predicted imminent or future interaction with a physical object.

In one or more embodiments, classification store 665 may include one or more trained networks used for classification. As an example, deep learning may be used to train a binary classifier to determine whether or not a user is interacting with a physical object in the environment. In one or more embodiments, classification store may provide data utilized to estimate an object type, for example using object recognition. As an example, a model may be used to receive an image data and determine a type of object among various types of objects a user may interact with.

Storage 640 may also include an object registration store 670. Object registration store 670 may store data regarding known objects. For example, the object registration store 670 may store geometries and other characteristics for known objects, such as preregistered objects and/or generic representation of particular object types.

In some embodiments, the electronic device 600 may include other components utilized for vision-based tracking, such as one or more cameras 605 and/or other sensors 610, such as one or more depth sensors. In one or more embodiments, each of the one or more cameras 605 may be a traditional RGB camera, a depth camera, or the like. Further, cameras 605 may include a stereo or other multicamera system, a time-of-flight camera system, or the like which capture images from which depth information of the scene may be determined.

In one or more embodiments, tracking module 645 may track user characteristics, such as location and/or gesture. The tracking module 645 may determine whether a user is potentially interacting with a physical object, using vision-based tracking. The tracking module 645 may determine when a touch occurs, for example, by obtaining depth information for a hand and the surface. As an example, the tracking module 645 may receive or obtain depth information from the camera 605, the depth sensor or other sensors 610. Further, the tracking module 645 may determine touch information from other data, such as stereo images captured by camera(s) 605, and the like. The tracking module 645 may then determine, based on the signal, that a touch event has occurred. In one or more embodiments, the estimation may be based on a number of factors, such as by utilizing a predefined model of a finger or other touching object, and/or the physical keyboard.

In some embodiments, the tracking module 645 may perform hand tracking to detect gestures. As an example, the electronic device 600 may have or have access to a hand model store for various hand poses. Those poses may be used as reference poses to which a current image of a hand may be compared. In some embodiments, the various hand poses may be associated with particular gestures and/or particular actions, for example in user profile store 660 or object registration store 670. In some embodiments, the hand model store may include hand poses of unoccupied hands, as well as occupied hands when the hands are occupied by various objects.

According to some embodiments, the object recognition module 650 may detect an object in a scene. For example, the object recognition module 650 may determine if a user's hands are in contact with a physical object and may determine a type of object in the user's hands, such as by classification data in classification store 665. In some embodiments, an object occupying the user's hand or hands may be detected by the object recognition module 650 as a known object such as a preregistered object from object registration store 670.

In some embodiments, tracking module 645 may be configured to track a user's location to determine if the user comes within a predetermined distance of a known object, such as an object registered in object registration store. In some embodiments, the tracking module 645 may use localization data to identify a location of the user, such as Wi-Fi, GPS information, visual odometry, and the like. In some embodiments, the predetermined distance may be a threshold distance for a particular object, or for any registered object. The tracking module 645 may track a user or a portion of a user, such as through hand tracking techniques, head tracking techniques, and the like.

Although electronic device 600 is depicted as comprising the numerous components described above, and one or more embodiments, the various components and functionality of the components may be distributed differently across one or more additional devices, for example across a network. For example, in some embodiments, any combination of user profile store 660, classification store 665, and object registration store 670 may be partially or fully deployed on additional devices, such as network devices, network storage, and the like. Similarly, in some embodiments, the functionality of tracking module 645 and object recognition module 650 may be partially or fully deployed on additional devices across a network.

Further, in one or more embodiments, electronic device 600 may be comprised of multiple devices in the form of an electronic system. Accordingly, although certain calls and transmissions are described herein with respect to the particular systems as depicted, in one or more embodiments, the various calls and transmissions may be differently directed based on the differently distributed functionality. Further, additional components may be used, or some combination of the functionality of any of the components may be combined.

Figure 7:
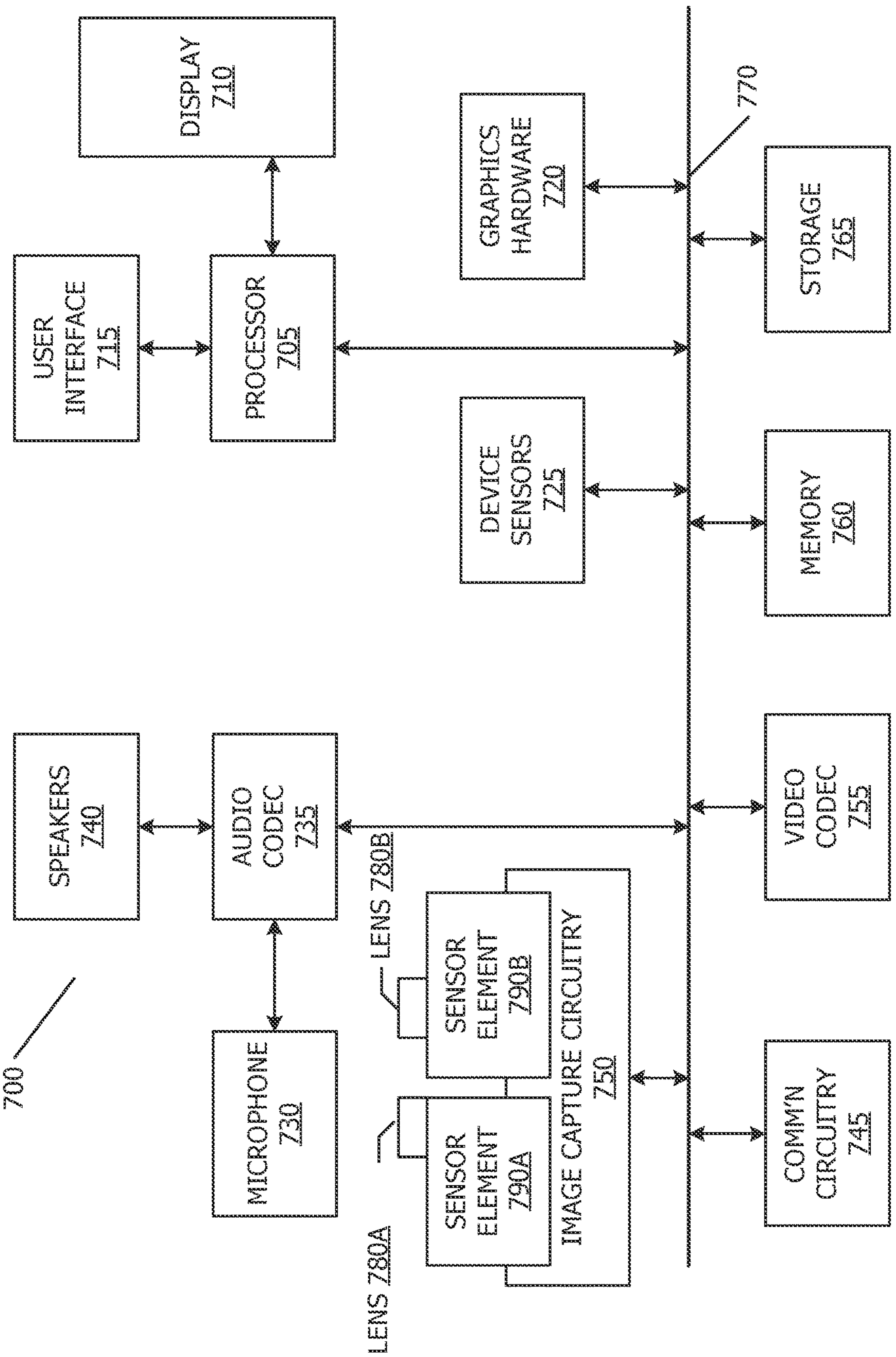
FIG. 7 shows, in block diagram form, a computer system in accordance with one or more embodiments.

Referring now to FIG. 7, a simplified functional block diagram of illustrative multifunction electronic device 700 is shown according to one embodiment. Each of the electronic devices may be a multifunctional electronic device or may have some or all of the described components of a multifunctional electronic device described herein. Multifunction electronic device 700 may include some combination of processor 705, display 710, user interface 715, graphics hardware 720, device sensors 725 (e.g., proximity sensor/ambient light sensor, accelerometer and/or gyroscope), microphone 730, audio codec 735, speaker(s) 740, communications circuitry 745, digital image capture circuitry 750 (e.g., including camera system), memory 760, storage device 765, and communications bus 770. Multifunction electronic device 700 may be, for example, a mobile telephone, personal music player, wearable device, tablet computer, and the like.

Processor 705 may execute instructions necessary to carry out or control the operation of many functions performed by device 700. Processor 705 may, for instance, drive display 710 and receive user input from user interface 715. User interface 715 may allow a user to interact with device 700. For example, user interface 715 can take a variety of forms, such as a button, keypad, dial, a click wheel, keyboard, display screen, touch screen, and the like. Processor 705 may also, for example, be a system-on-chip such as those found in mobile devices and include a dedicated GPU. Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include one or more lens assemblies, such as 780A and 78013. The lens assemblies may have a combination of various characteristics, such as differing focal length and the like. For example, lens assembly 780A may have a short focal length relative to the focal length of lens assembly 78013. Each lens assembly may have a separate associated sensor element 790. Alternatively, two or more lens assemblies may share a common sensor element. Image capture circuitry 750 may capture still images, video images, enhanced images, and the like. Output from image capture circuitry 750 may be processed, at least in part, by video codec(s) 755 and/or processor 705 and/or graphics hardware 720, and/or a dedicated image processing unit or pipeline incorporated within circuitry 745. Images so captured may be stored in memory 760 and/or storage 765.

Memory 760 may include one or more different types of media used by processor 705 and graphics hardware 720 to perform device functions. For example, memory 760 may include memory cache, read-only memory (ROM), and/or random-access memory (RAM). Storage 765 may store media (e.g., audio, image and video files), computer program instructions or software, preference information, device profile information, and any other suitable data. Storage 765 may include one more non-transitory computer-readable storage mediums, including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to tangibly retain computer program instructions or computer readable code organized into one or more modules and written in any desired computer programming language. When executed by, for example, processor 705, such computer program code may implement one or more of the methods described herein.

As described above, one aspect of the present technology is providing visual-based gesture recognition. The present disclosure contemplates that in some instances, this gathered data may include personal information data that uniquely identifies or can be used to contact or locate a specific person. Such personal information data can include demographic data, location-based data, telephone numbers, email addresses, social media handles, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to detect objects in a user's environment and associated hand gestures. Accordingly, use of such personal information data enables users to identify real objects and hand gestures from image data.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1-3 and 5 or the arrangement of elements shown in FIGS. 1, 4, and 6-7 should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A method comprising:

detecting, based on sensor data of a view of a physical environment, a first user interaction with a physical object in the physical environment;

determining an object type of the physical object;

obtaining an object-centric affordance region for the object type, wherein the object-centric affordance region indicates, for each of one or more regions of a geometry representative of the object type, a likelihood of user contact;

applying the object-centric affordance region to a virtual representation of the physical object to obtain an instance-specific affordance region; and generating a virtual representation of a user performing the first user interaction with the virtual representation of the physical object in accordance with the instance-specific affordance region.

2. The method of claim 1, wherein the object-centric affordance region is further associated with an interaction type of the first user interaction.

3. The method of claim 1, wherein determining the instance-specific affordance region comprises:

obtaining a generic geometric representation for the object type, wherein the object-centric affordance region corresponds to the generic geometric representation; and performing a correspondence mapping between the generic geometric representation and a geometry of the physical object.

4. The method of claim 3, wherein the geometry of the physical object is obtained by scanning, by a local device, the physical object.

5. The method of claim 3, wherein one or more faces of the generic geometric representation are associated with a likelihood of user contact for a corresponding face.

6. The method of claim 1, further comprising:

determining a second user interaction with the physical object in the physical environment;

obtaining a second object-centric affordance region of the object type, wherein the second object-centric affordance region indicates a likelihood of user contact for the second user interaction; and applying the second object-centric affordance region to a geometry of the physical object.

7. The method of claim 6, further comprising:

in accordance with a determination that the first user interaction and the second user interaction are likely to occur concurrently, modifying the instance-specific affordance region in accordance with the second object-centric affordance region.

8. The method of claim 1, wherein the object-centric affordance region is generated by:

collecting training data of prior instances of the first user interaction with a plurality of objects of the object type;

for each of the plurality of objects:

generating a geometric representation of the physical object and a geometric representation of a user performing the first user interaction, and assigning a contact value to each of a plurality of regions of the geometric representation based on the geometry representative of the object type and the geometric representation of the user performing the first user interaction; and combining the contact values for each of the plurality of regions across each of the plurality of objects.

9. The method of claim 1, wherein the first user interaction is detected based on sensor data collected by a local device.

10. A non-transitory computer readable medium comprising computer readable code executable by one or more processors to:

detect, based on sensor data of a view of a physical environment, a first user interaction with a physical object in the physical environment;

determine an object type of the physical object;

obtain an object-centric affordance region for the object type, wherein the object-centric affordance region indicates, for each of one or more regions of a geometry representative of the object type, a likelihood of user contact;

apply the object-centric affordance region to a virtual representation of the physical object to obtain an instance-specific affordance region; and generate a virtual representation of a user performing the first user interaction with the virtual representation of the physical object in accordance with the instance-specific affordance region.

11. The non-transitory computer readable medium of claim 10, wherein the object-centric affordance region is further associated with an interaction type of the first user interaction.

12. The non-transitory computer readable medium of claim 10, wherein the computer readable code to apply the object-centric accordance region to the virtual representation of the physical object comprises computer readable code to:

obtain a generic geometric representation for the object type, wherein the object-centric affordance region corresponds to the generic geometric representation; and perform a correspondence mapping between the generic geometric representation and a geometry of the physical object.

13. The non-transitory computer readable medium of claim 12, wherein the geometry of the physical object is obtained by scanning, by a local device, the physical object.

14. The non-transitory computer readable medium of claim 12, wherein one or more faces of the generic geometric representation are associated with a likelihood of user contact for corresponding face.

15. A system comprising:

one or more processors; and one or more computer readable media comprising computer readable code executable by the one or more processors to:

detect, based on sensor data of a view of a physical environment, a first user interaction with a physical object in the physical environment;

determine an object type of the physical object;

obtain an object-centric affordance region for the object type, wherein the object-centric affordance region indicates, for each of one or more regions of a geometry representative of the object type, a likelihood of user contact;

applying the object-centric affordance region to a virtual representation of the physical object to obtain an instance-specific affordance region; and generate a virtual representation of a user performing the first user interaction with the virtual representation of the physical object in accordance with the instance-specific affordance region.

16. The system of claim 15, further comprising computer readable code to:

determine a second user interaction with the physical object in the physical environment;

obtain a second object-centric affordance region of the object type, wherein the second object-centric affordance region indicates a likelihood of user contact for the second user interaction; and apply the second object-centric affordance region to a geometry of the physical object.

17. The system of claim 16, further comprising computer readable code to:

in accordance with a determination that the first user interaction and the second user interaction are likely to occur concurrently, modify the instance-specific affordance region in accordance with the second object-centric affordance region.

18. The system of claim 17, wherein the object-centric affordance region is generated by:

collecting training data of the training data of prior instances of the first user interaction with a plurality of objects of the object type;

for each of the plurality of objects:

generating a geometric representation of a corresponding object and a geometric representation of a user performing the user interaction, and assigning a contact value to each of a plurality of regions of the geometric representation based on the geometric representation of the corresponding object and the geometric representation of the first user interaction; and combining the contact values for each of the plurality of regions across each of the plurality of objects.

* * * * *